United States Patent [19]

Aoyama

[11] Patent Number: 5,568,222
[45] Date of Patent: Oct. 22, 1996

[54] FOCUS DETECTING APPARATUS DETECTING FOCUS TO A PLURALITY OF AREAS

[75] Inventor: Keisuke Aoyama, Yokohama, Japan

[73] Assignee: Canon Kabushiki Kaisha, Tokyo, Japan

[21] Appl. No.: 270,313

[22] Filed: Jul. 5, 1994

Related U.S. Application Data

[63] Continuation of Ser. No. 932,543, Aug. 20, 1992, abandoned.

[30] Foreign Application Priority Data

Aug. 21, 1991 [JP] Japan ................................. 3-209481

[51] Int. Cl.⁶ .................................................. G03B 13/36
[52] U.S. Cl. .............................. 396/123; 396/99; 396/121
[58] Field of Search .................................. 354/400, 402, 354/403, 404, 405, 406, 407, 408

[56] References Cited

U.S. PATENT DOCUMENTS

| | | | |
|---|---|---|---|
| 4,716,434 | 12/1987 | Taniguchi et al. | 354/408 |
| 4,720,724 | 1/1988 | Yokoo | 354/403 |
| 4,829,331 | 5/1989 | Aihara | 354/402 |
| 4,851,657 | 7/1989 | Taniguchi et al. | 354/408 |
| 4,933,700 | 6/1990 | Ikeda et al. | 354/402 |
| 4,980,716 | 12/1990 | Suzuki et al. | 354/403 |
| 5,005,041 | 4/1991 | Suda et al. | 354/407 |
| 5,051,766 | 9/1991 | Nonaka et al. | 354/402 |
| 5,053,801 | 10/1991 | Ishida et al. | 354/402 |
| 5,068,682 | 11/1991 | Utagawa | 354/402 |
| 5,070,352 | 12/1991 | Kotani et al. | 354/402 |
| 5,091,742 | 2/1992 | Fukahori et al. | 354/402 |
| 5,121,151 | 6/1992 | Kawabata et al. | 354/402 |

FOREIGN PATENT DOCUMENTS 63-018314  1/1988  Japan .

*Primary Examiner*—Russell E. Adams
*Attorney, Agent, or Firm*—Fitzpatrick, Cella, Harper & Scinto

[57] ABSTRACT

A focus detecting apparatus detecting focus to a plurality of areas receives outputs from a plurality of sensors. A processing circuit evaluates the plurality of output signals from the respective plurality of sensors, and independently evaluates whether or not each of the output signals fulfills each of a plurality of predetermined judgement conditions. A selection circuit (i) determines the total number of judgement conditions fullfilled by each of the output signals, (ii) selects the output from one of the plurality of sensors on the basis of the determination.

15 Claims, 13 Drawing Sheets

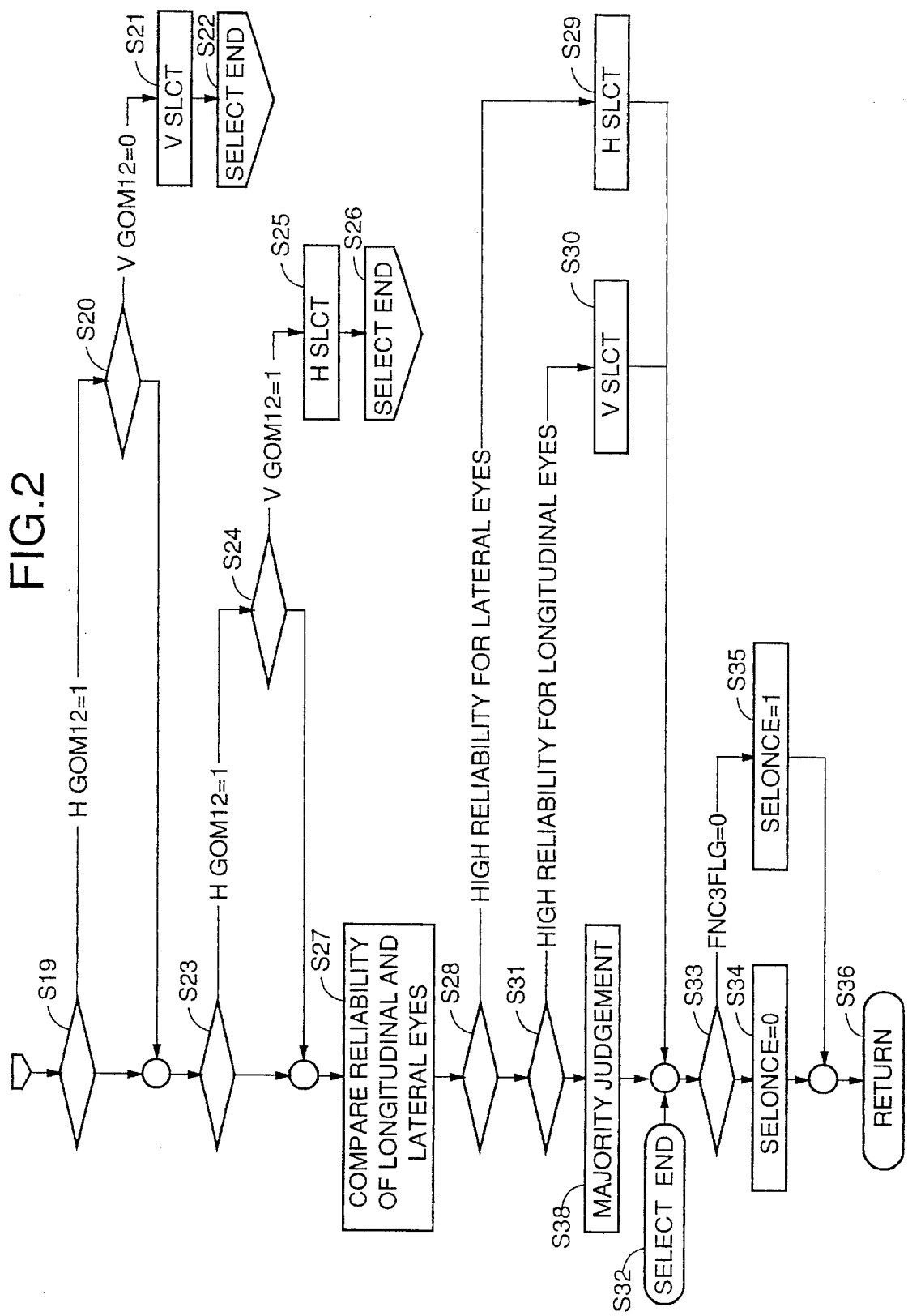

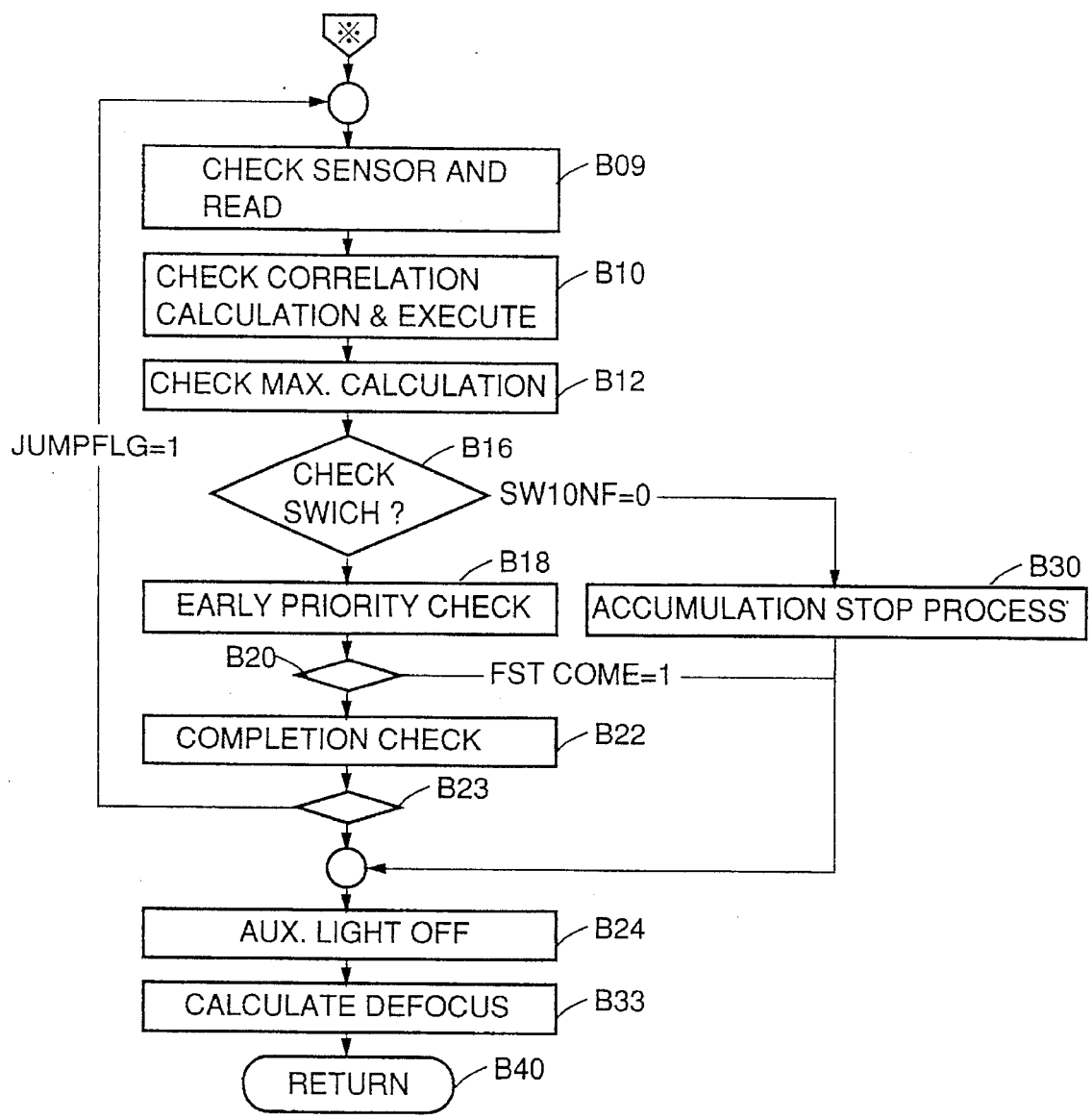

FOCUS DETECTING APPARATUS DETECTING FOCUS TO A PLURALITY OF AREAS

This application is a continuation of application Ser. No. 07/932,543 filed Aug. 20, 1992, now abandoned.

BACKGROUND OF THE INVENTION

1. Field of the Invention

This invention relates to an automatic focus detecting apparatus for detecting the defocus amounts of a plurality of areas of an image field and effecting the focus adjustment of a photo-taking lens.

2. Related Background Art

In the automatic focus detecting apparatus of a camera, there is well known an automatic focus adjusting method whereby light beams from an object passed through different exit pupil areas of a photo-taking lens are imaged on a pair of line sensors and the amount of displacement of the relative positions of a pair of image signals obtained by photoelectrically converting the object image is found to thereby detect the defocus amount of the object and the photo-taking lens is driven on the basis thereof.

There is further a construction in which a plurality of such focus detecting systems are disposed so that focus detection in a plurality of areas can be accomplished, or a construction in which line sensors are disposed cruciformly, whereby whether the distribution of the quantity of light in the same area is in a vertical direction or in a horizontal direction, focus detection is possible.

Where there is a plurality of focus detecting systems, a defocus amount is found for each focus detecting system and thus, a plurality of defocus amounts are detected and therefore, among these defocus amounts, a defocus amount for effecting focus adjustment needs be selected. Heretofore, when selecting the defocus for use for focus adjustment from among the defocus amounts of a plurality of areas, a plurality of results of focus detection obtained in the manner described above have been compared to determine the final defocus amount. However, the focus detecting operations for a plurality of focus detection areas do not terminate at a common time because the accumulation times of sensors are irregular due to the brightness of an object or the like. This has led to a disadvantage that when the accumulation in one of the sensors at respective focus detection points does not terminate, the total focus detecting time becomes long. In order to solve this, there has been proposed a method of effecting focus detection with the accumulation in the sensors being interrupted, but it is often the case that the result of focus detection of the focus detection areas for which the accumulation has been interrupted is not suitable for focus detection and thus, after all, useless focus detection calculation is effected.

Also, in the prior-art method of determining defocus, several conditions have been successively judged and the final defocus amount has been determined. That is, sequential judgement has been done in such a manner that at first, the reliability of the object image is judged from the contrast thereof, and then the degree of coincidence between images is judged with respect to images of good contrast, and finally is judged by the defocus amount to determine the final focus detection area.

In such a method, however, there is the possibility of selecting a focus detection area unsuitable for focus detection depending on the order in which judgement is done or the condition under which judgement is done, and correct focus detection is hampered.

SUMMARY OF THE INVENTION

One aspect of the invention is the provision of a focus detecting apparatus in which when focus detection is effected independently at a plurality of focus detection points and focus detection is terminated for one of the focus detection points, the result of focus detection for said one focus detection point is judged without waiting for the result of focus detection at the other focus detection points and the focus detection point is selected to thereby effect quick focus detection.

Another aspect of the invention is the provision of a focus detecting apparatus in which a plurality of conditions are set as conditions for setting focus detection points and with the conditions being collectively taken into consideration, the selection of the focus detection points is effected to thereby solve the above-noted problem.

Other objects of the present invention will become apparent from the following detailed description of an embodiment of the invention taken in conjunction with the accompanying drawings.

BRIEF DESCRIPTION OF THE DRAWINGS

FIG. 2, together with FIG. 1, shows portions of the sensor selection subroutine.

FIGS. 3A and 3B are illustrations showing the focus detection subroutine.

DESCRIPTION OF THE PREFERRED EMBODIMENT

Figure 1:
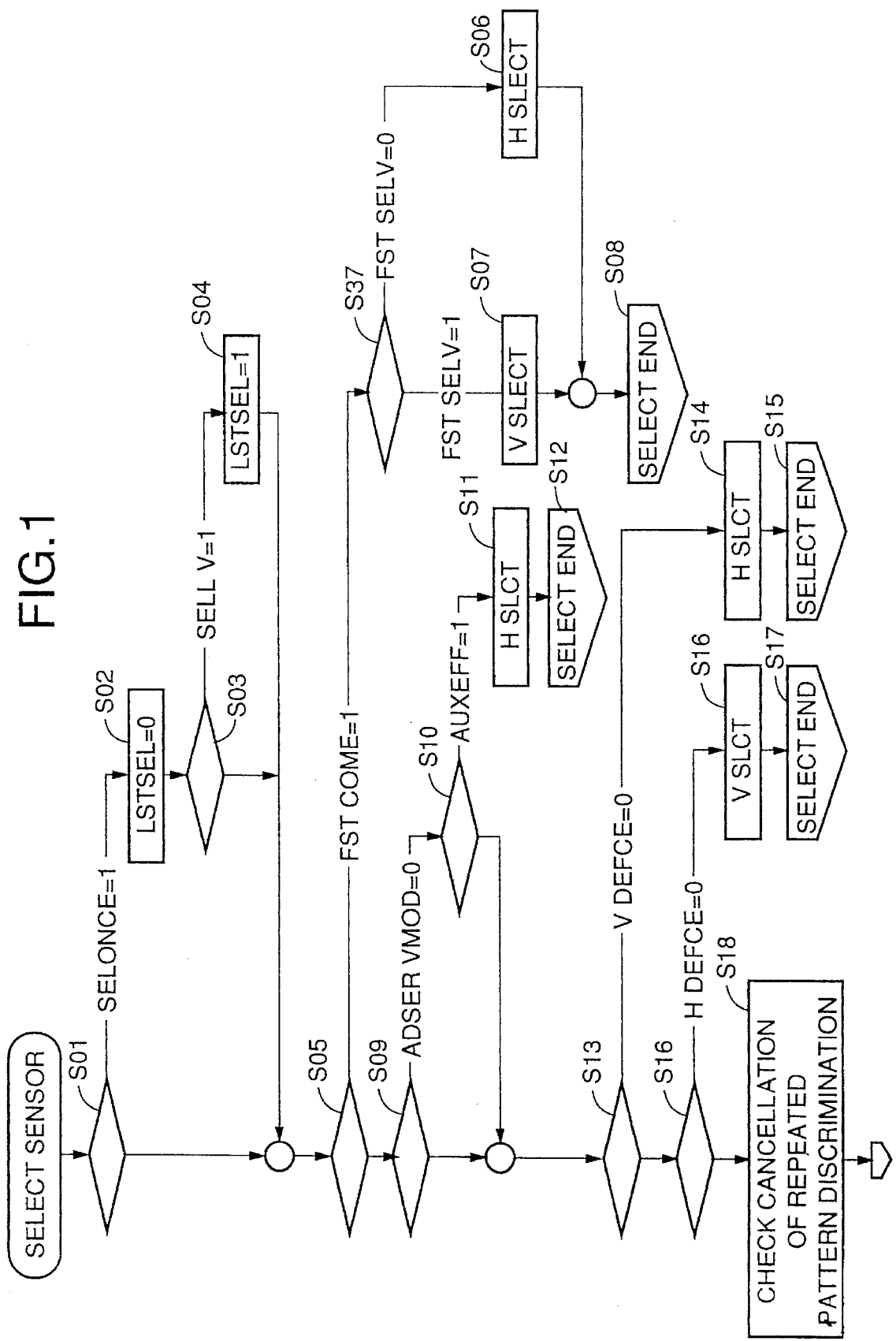
FIG. 1 is an illustration showing portions of the sensor selection subroutine in a focus detecting apparatus according to the present invention.

The present invention will hereinafter be described in detail with respect to an embodiment thereof shown in the drawing.

Figure 9:
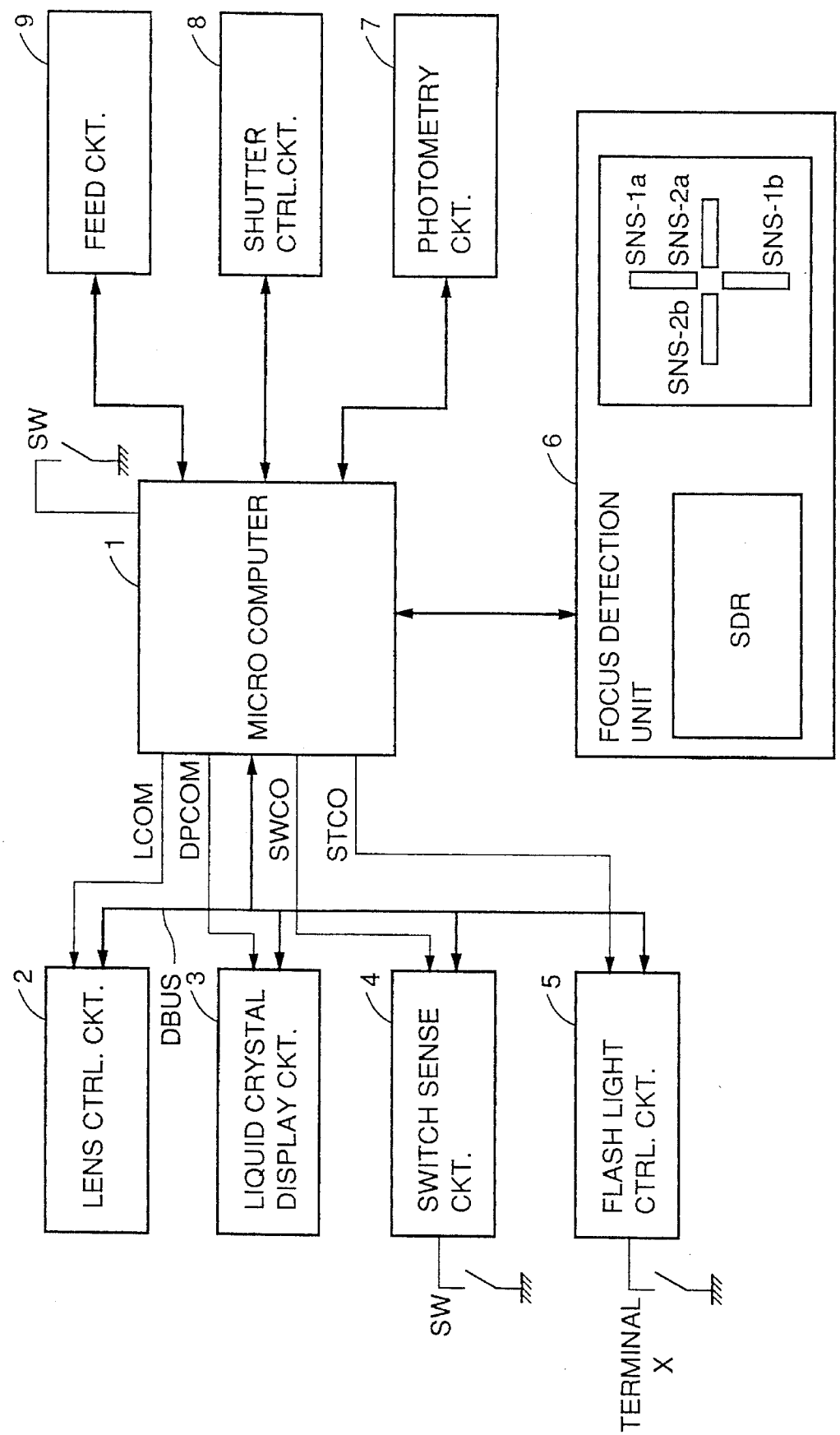
FIG. 9 is a block diagram showing an embodiment of a camera having the focus detecting apparatus according to the present invention.

FIG. 9 shows an example of the specific construction of the electrical control blocks of a camera provided with a focus detecting apparatus according to the present embodiment, and the construction of each portion will first be described.

The reference numeral 1 designates a microcomputer which controls the operation of each portion of the camera which will hereinafter be described.

The reference numeral 2 denotes a lens control circuit which controls the distance ring and aperture of a photo-taking lens, not shown. This lens control circuit 2 effects serial communication through DBUS as long as it receives a signal LCOM from the microcomputer 1, and controls a motor, not shown, from the substance of this communication and controls the distance ring and aperture. Also, the microcomputer 1 receives the focal length information of the lens, distance information, the best focus correction information and other various kinds of correction information.

The reference numeral 3 designates a liquid crystal display circuit which is a circuit for displaying the various kinds of photographing information of the camera such as shutter speed and aperture control value. This liquid crystal display circuit 3 effects serial communication through DBUS as long as it receives a signal DPCOM from the microcomputer 1, and effects liquid crystal display from the substance of this communication.

The reference numeral 4 denotes a switch sense circuit which, together with the liquid crystal circuit 3, is always supplied with a power source and which, in an ordinary camera, can always read a switch operatively associated with a first stroke for starting the photographing preparation of the release button of the camera (hereinafter referred to as SW1), a switch, not shown, for determining the exposure mode, and a switch, not shown, for determining the automatic focus adjustment (AF) mode of the camera. Particularly in the present embodiment, an AF mode setting switch is designed to read whether the mode is the "ONE SHOT" mode (in which the focus is locked once the lens is in focus) or the "SERVO" mode (in which focus detection is effected irrespective of in-focus or out-of-focus). This switch sense circuit 4 effects serial communication through DBUS when the switches are changed over, and communicates the information of each switch to the microcomputer 1.

The reference numeral 5 designates a flash device control circuit, i.e., a circuit for controlling the light emission and adjustment of a flash device. The flash control circuit 5 comprises existing circuits such as a circuit for accumulating charges for light emission, a xenon tube which is a light emitting portion, a trigger circuit, a circuit for stopping the light emission, a photometry circuit for reflected light from the surface of the film, and an integration circuit, and starts the flashing of the flash device by a terminal X which is adapted to be closed by the movement of the front curtain of a shutter unit being closed.

The reference numeral 6 denotes a focus detection unit comprising the mechanism of an optical system including a line sensor device SNS which will be described later with reference to FIG. 10 and a driving circuit SDR therefor. The line sensor device SNS comprises two pairs of sensor arrays SNS-1a, SNS-1b and SNS-2a, SNS-2b, and charges are accumulated therein by a control signal from the driving circuit SDR. The sensor driving circuit SDR receives a sensor accumulation starting signal from the microcomputer 1, whereupon it starts the accumulation in the sensor, and effects the accumulation until the accumulation level in the sensor reaches a predetermined level. When the accumulation level reaches the predetermined level, the sensor driving circuit SDR terminates the accumulation in the sensor, and serially communicates the termination of the accumulation in the sensor to the microcomputer 1 through DBUS. When the microcomputer 1 effects sensor signal reading communication to the sensor driving circuit SDR, the sensor driving circuit SDR outputs a sensor driving signal to the line sensor device SNS, and signals accumulated in the line sensor are read out by the microcomputer 1, and AD conversion is effected in synchronism with the sensor driving signal so that from the AD-converted image signal of an object, the position at which the object is focused by the photo-taking lens may be detected by calculation by the use of the existing phase difference detecting method.

The reference numeral 7 designates a photometry circuit which serves to divide the image field into a plurality of areas, and TTL-meter the brightness of the object in each area and send it to the microcomputer 1.

The reference numeral 8 denotes a shutter control circuit which controls a shutter unit, not shown, in accordance with the control signal of the microcomputer 1.

The reference numeral 9 designates a feed circuit which controls a film feeding motor in accordance with the control signal of the microcomputer 1 and effects the winding and rewinding of the film.

Figure 10:
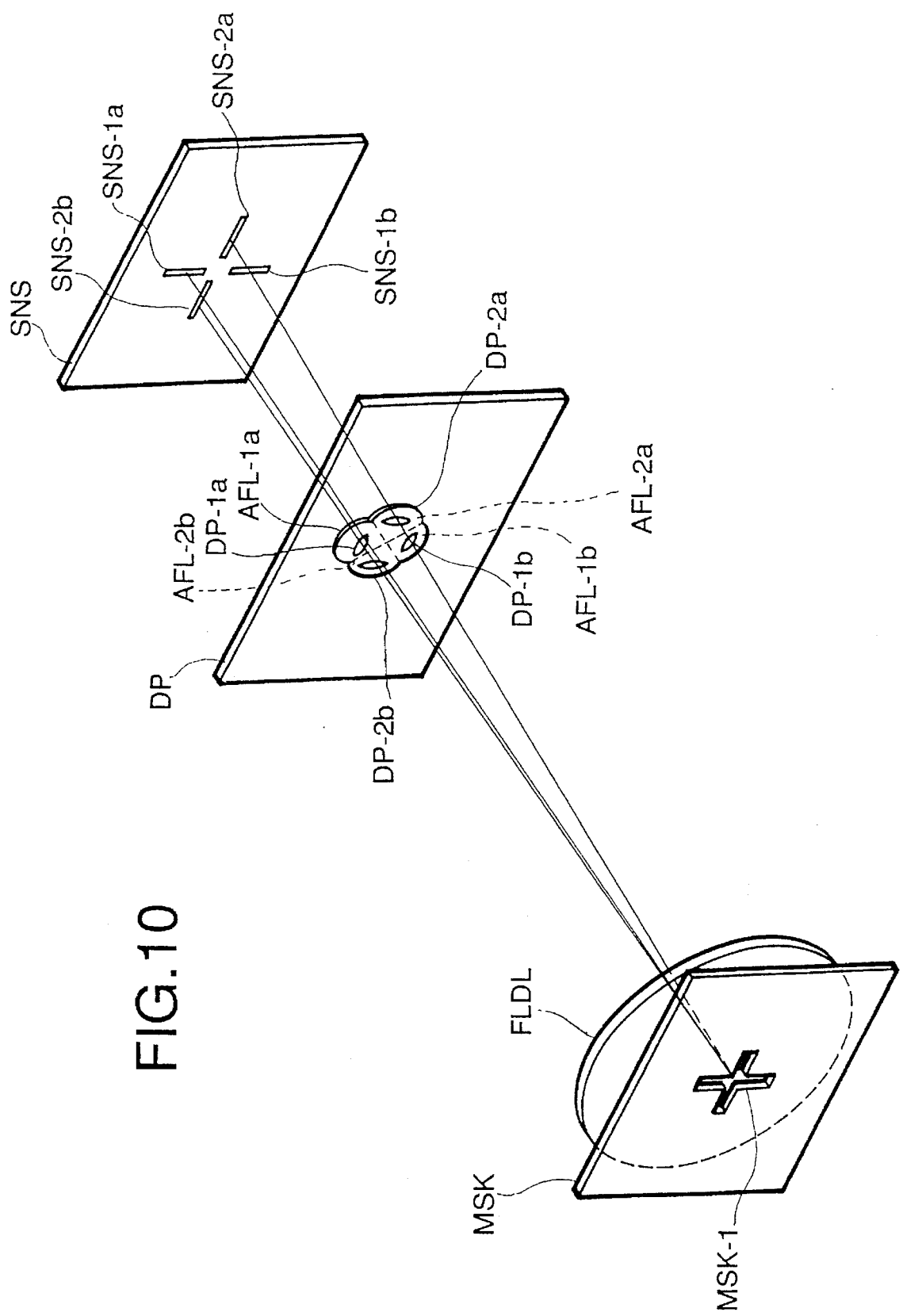
FIG. 10 shows the construction of the focus detecting optical system of the focus detecting apparatus.

FIG. 10 schematically shows the construction of an optical system used for the focus detection of the present embodiment.

In this figure, MSK denotes a field mask having a cruciform opening MSK-1 at the center thereof. FLDL designates a field lens. DP denotes a diaphragm formed with two vertical and horizontal pairs of openings DP-1a, DP-1b and DP-2a, DP-2b in the central portion thereof. The field lens FLDL has the function of imaging these pairs of openings near the exit pupil of an objective lens, not shown. AFL denotes a secondary imaging lens comprising two pairs of lenses AFL-1a, AFL-1b and AFL-2a, AFL-2b disposed rearwardly of the openings in the diaphragm DP correspondingly thereto. SNS designates a line sensor device comprising two pairs of sensor arrays SNS-1a, SNS-1b and SNS-2a, SNS-2b disposed so as to receive the images of the respective lenses of the secondary imaging lens corresponding thereto.

In the focus detecting optical system shown in FIG. 10, where the focus of the photo-taking lens is forwardly of the surface of the film, object images formed on the horizontal pair of sensors (or the vertical pair of sensors) become close to each other, and where the focus of the photo-taking lens is rearward of the surface of the film, the object images become spaced apart from each other. The amount of displacement of the relative positions of these object images is in a particular function relation with the amount of out-of-focus of the photo-taking lens and therefore, if in each pair of sensor arrays, suitable calculation is effected for the sensor outputs thereof, the amount of out-of-focus, i.e., the so-called defocus amount, of the photo-taking lens can be detected.

By adopting the above-described construction, near the center of the range photographed by or observed through the objective lens, not shown, distance measurement can be accomplished even for an object of which the distribution of quantity of light varies only in a vertical direction or a horizontal direction.

Figure 11:
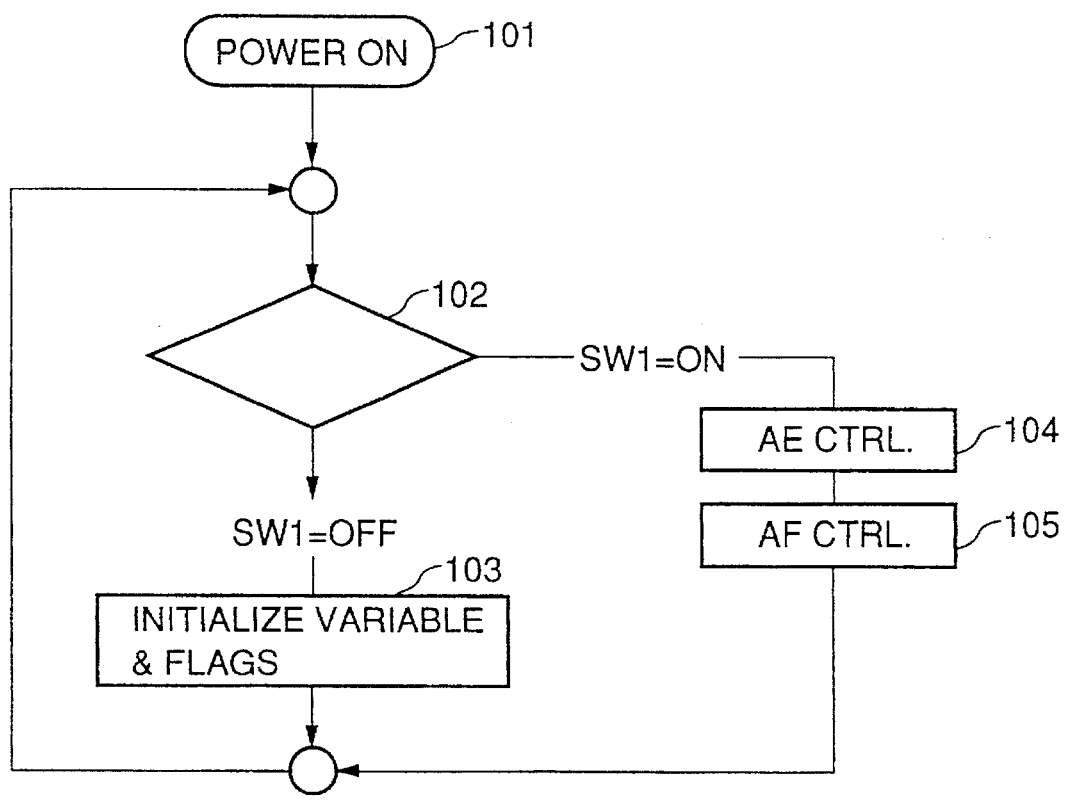
FIG. 11 illustrates the general operation of the camera shown in FIG. 9.

A description will hereinafter be specifically of the controlling operation for automatic focus adjustment effected in the camera of the present embodiment provided with the focus detecting apparatus as described above. When the supply of electric power to the circuit shown in FIG. 9 is started, the microcomputer 1 starts to execute the step 101 of FIG. 11 and so on. That is, at a step 102, the state of the switch SW1 adapted to be closed by the first-stage depression of a release button is detected, and if the switch SW1 is OFF, shift is made to a step 103, where variables in the program and the flags of the CPU are initialized, and return is made to the step 102. When the switch SW1 becomes ON in the course in which this routine is repeated, shift is made to a step 104, and the photographing preparation of the camera is started.

At the step 104, the "AE control" subroutine in which photometry, the detection of the states of various switches and the display of the result thereof are effected is called and executed. The substance of the "AE control" subroutine has nothing direct to do with the present invention and therefore need not be described in detail.

When the "AE control" subroutine is terminated, shift is made to a step 105, where the "AF control" subroutine is executed. Here, the accumulation in the sensors, the focus detection calculation and the automatic focus adjusting operation for lens driving are effected, and when the "AF control" subroutine is terminated, return is made to the step 102, and the steps 104 and 105 are repetitively executed until the switch SW1 becomes OFF.

In the above-described flow chart, the substance of the release operation is not described, yet the release operation is similar to that in ordinary single-lens reflex cameras.

Figure 12:
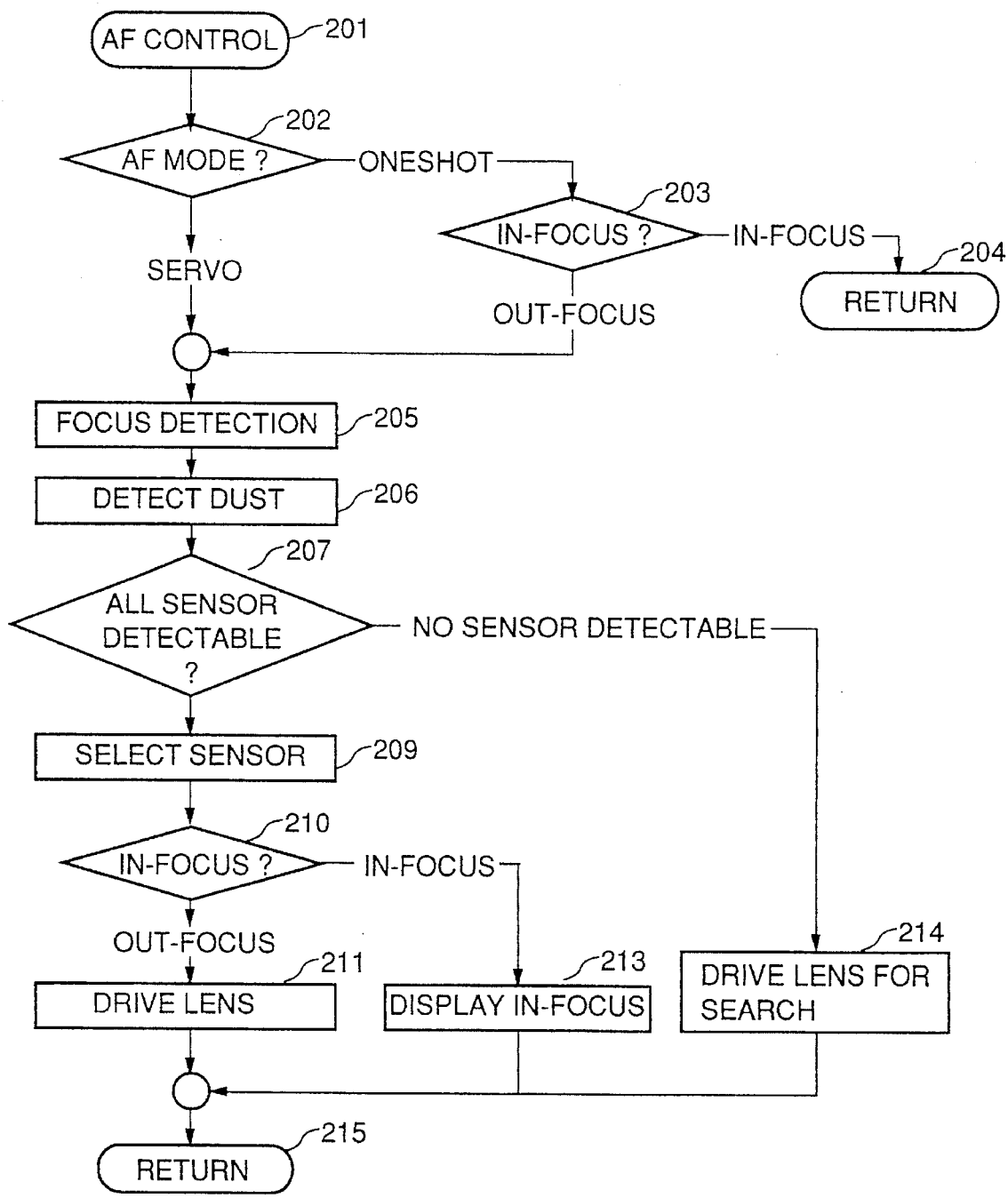
FIG. 12 illustrates the auto focus control subroutine.

FIG. 12 is a flow chart of the "AF control" subroutine executed at the step 105.

When the "AF control" subroutine is called, the AF control of a step 202 and so on is executed via a step 201.

At the step 202, whether the AF mode is the ONE SHOT mode or the SERVO mode is judged, and if it is the ONE SHOT mode, shift is made to a step 203. This mode is preset by the mode setting switch as 1 previously described.

At the step 203, whether the result of the last focus detection has been in-focus is judged, and if it has been in-focus, a new focus detecting operation is not performed, but at a step 204, the "AF control" subroutine is returned.

If at the step 203, it is not judged that the result of the last focus detection has been in-focus or if at the step 202, the AF mode is the SERVO mode, shift is made to a step 205 to perform a new focus adjusting operation.

At the step 205, the "focus detection" subroutine in which the focus detection of a plurality of object areas is effected and the defocus amount of each area is detected is executed.

Figure 3A:
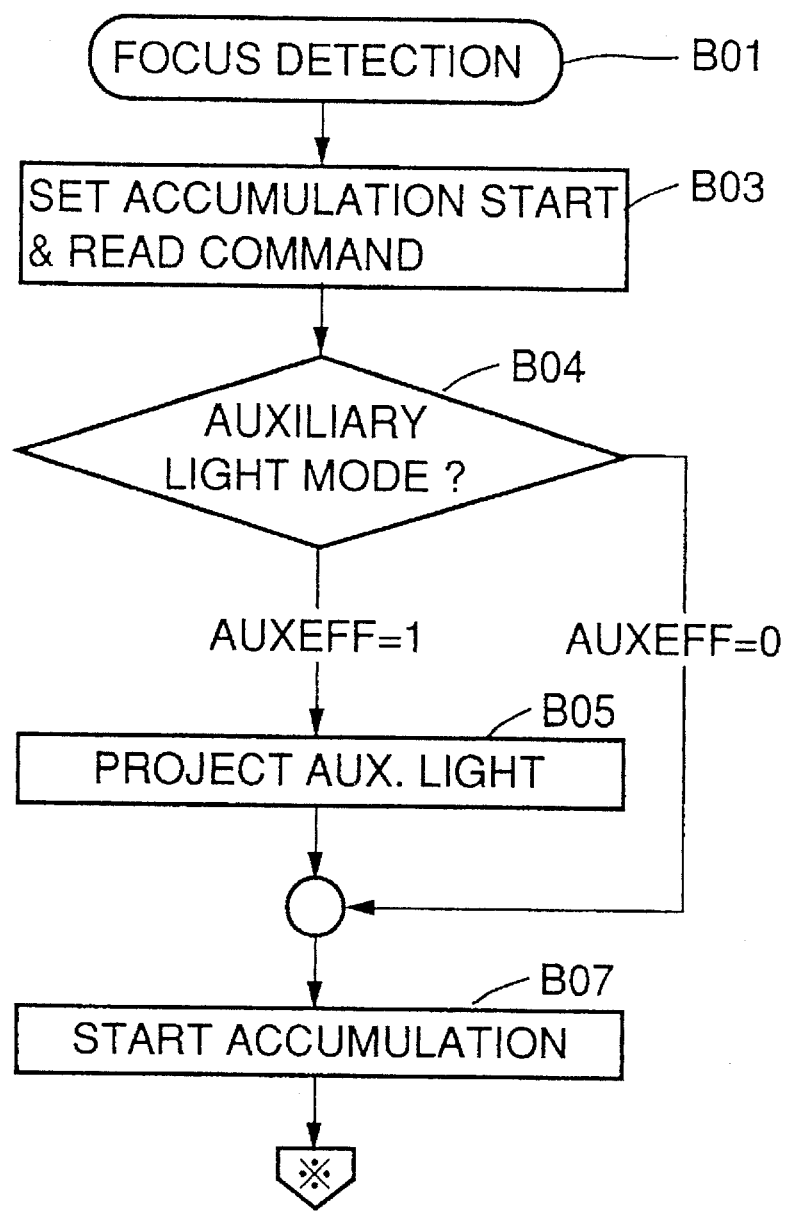

FIG. 3 is a flow chart for illustrating the "focus detection" subroutine. When the "focus detection" subroutine is called, a step B03 and subsequent steps are successively executed via a step B01.

First, at the step B03, the sensor accumulation start and read command is set and advance is made to a step B04.

At the step B04, whether the auxiliary light mode is set is judged by AUXEFF flag. If AUXEFF=1 (auxiliary light mode), advance is made to a step B05, where the emission of auxiliary light is started, whereafter advance is made to a step B07. If AUXEFF=0 (not the auxiliary light mode), nothing is done, but advance is made to a step B07.

At the step B07, the accumulation in the sensors is started, and shift is made to the loop of a step B09, where the process of sensor reading and correlation calculation is executed.

At the step B09, sensor reading check and sensor reading are effected. As this operation, whether the accumulation in each sensor has been terminated is first judged, and when there is any one of the sensors in which the accumulation has been terminated, if the image signal of that sensor is not yet read, the reading of the image signal is effected for that sensor.

Correlation calculation check and correlation calculation are then executed. Whether the correlation calculation of the focus detection point for the sensor of which the reading has been terminated has been completed is judged, and if the correlation calculation of that focus detection point is not yet effected, it is effected, and after the correlation calculation for that focus detection point has been completed, advance is made to a step B12. If there is no focus detection point of which the reading has been terminated or if the correlation calculation of all focus detection points of which the reading has been terminated has been completed, nothing is done but advance is made to the step B12.

At the step B12, the maximum accumulation time is checked. If the accumulation in the sensors is not yet terminated even after a preset time (the maximum accumulation time) has passed, the accumulation in the sensors is forcibly terminated. If the accumulation time has not reached the maximum accumulation time, nothing is done but advance is made to a step B16.

At the step B16, whether the switch SW1 of the camera has been opened during the accumulation is judged by SW1ONF, and if SW1ONF=0, that is, the switch SW1 is opened, advance is made to a step B30, where the accumulation stop process is carried out. After the accumulation stop process, the loop is passed through and advance is made to a step B24.

If at the step B16, there is no change in the switch and the switch SW1 remains depressed (SW1ONF=1), advance is made to a step B18, where the early priority check routine is executed.

Figure 4:
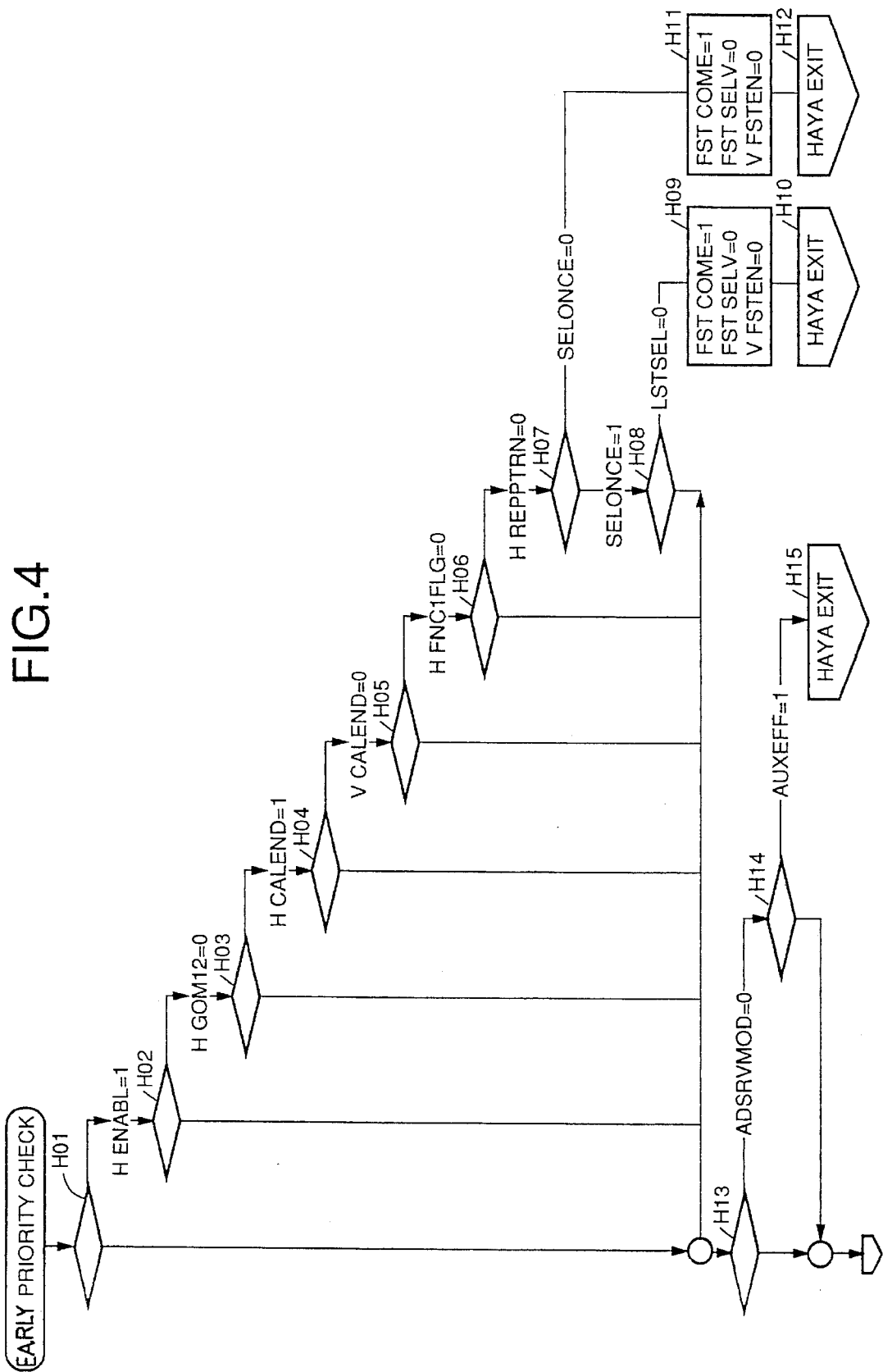
FIG. 4 is an illustration showing portions of the early priority check subroutine.

FIG. 4 is a flow chart of the "early priority check" subroutine.

First, at a step H01, a flag H_ENABL showing whether the horizontal focus detection point is in a focus detection state is judged. If the flag H_ENABL is 1, that is, the horizontal focus detection point is in a focus detection state, advance is made to a step H02, and if the flag H_ENABL is 0, that is, the horizontal focus detection point is not in a focus detection state, advance is made to a step H13. It is to be understood that usually this flag H_ENABL is set to 1.

At the step H02, a flag H_GOM12 showing whether the horizontal focus detection point is not capable of focus detection due to dust is judged. If the flag H_GOM12 is 1, that is, the horizontal focus detection point is not capable of focus detection due to dust, advance is made to a step H13, and if the flag H_GOM12 is 0, that, no dust is present and the horizontal focus detection point is capable of focus detection, advance is made to a step H03.

At the step H03, a flag H_CALEND showing whether the focus detection calculation of the horizontal focus detection point has been terminated is judged. If the flag H_CALEND is 1, that is, the focus detection calculation of the horizontal focus detection point has been terminated, advance is made to a step H04, and if the flag H_CALEND is 0, that is, the focus detection calculation of the horizontal focus detection point has not been terminated, advance is made to the step H13.

At the step H04, a flag V_CALEND showing whether the focus detection calculation of the vertical focus detection point has been terminated is judged. If the flag V_CALEND is 1, that is, the focus detection calculation of the vertical focus detection point has been terminated, advance is made to the step H13, and if the flag V_CALEND is 0, that is, the focus detection calculation of the vertical focus detection point has not been terminated, advance is made to a step H05.

Summing up what has been described, advance is made to the step H05 only if the horizontal focus detection point is in a focus detection state and the vertical focus detection point has not terminated focus detection calculation, while the horizontal focus detection point has terminated focus detection calculation.

At the step H05, a flag H_FNC1FLG showing whether the reliability of the focus detection data of the horizontal focus detection point is good is judged. If the flag H_FNC1FLG is 1, that is, the reliability is null and is unsuitable for focus detection, advance is made to the step H13, and if the flag H_FNC1FLG is 0, that is, reliability is sufficient and is suitable for focus detection, advance is made to a step H06.

At the step H06, a flag H_REPPTRN showing whether the object image at the horizontal focus detection point is a repetitive pattern is judged. If the flag H_REPPTRN is 1, there is the possibility of the object image at the horizontal focus detection point being a repetitive pattern and therefore advance is made to the step H13, and if the flag H_REPPTRN is 0, the object image at the horizontal focus detection point is not a repetitive pattern and therefore advance is made to a step H07.

At the step H07, a flag SELONCE showing whether the selection of the focus detection point has already been effected is judged. If the flag SELONCE is 1, that is, the selection of the focus detection point has already been effected, advance is made to a step H08, and if the flag SELONCE is 0, that is, the selection of the focus detection point is now effected for the first time, advance is made to a step H11.

At the step H11, flags showing that the horizontal focus detection point has been selected by early priority are set. That is, a flag FST_COME showing that the focus detection point has been selected by early priority is set to 1, a flag FST_SELV showing that the horizontal focus detection point has been selected by early priority is set to 0, and a flag V_FSTEN which effects the selection of the focus detection point by early priority and thereafter nullifies the vertical focus detection point is set to 0. Thereafter, advance is made to a step H12.

Figure 5:
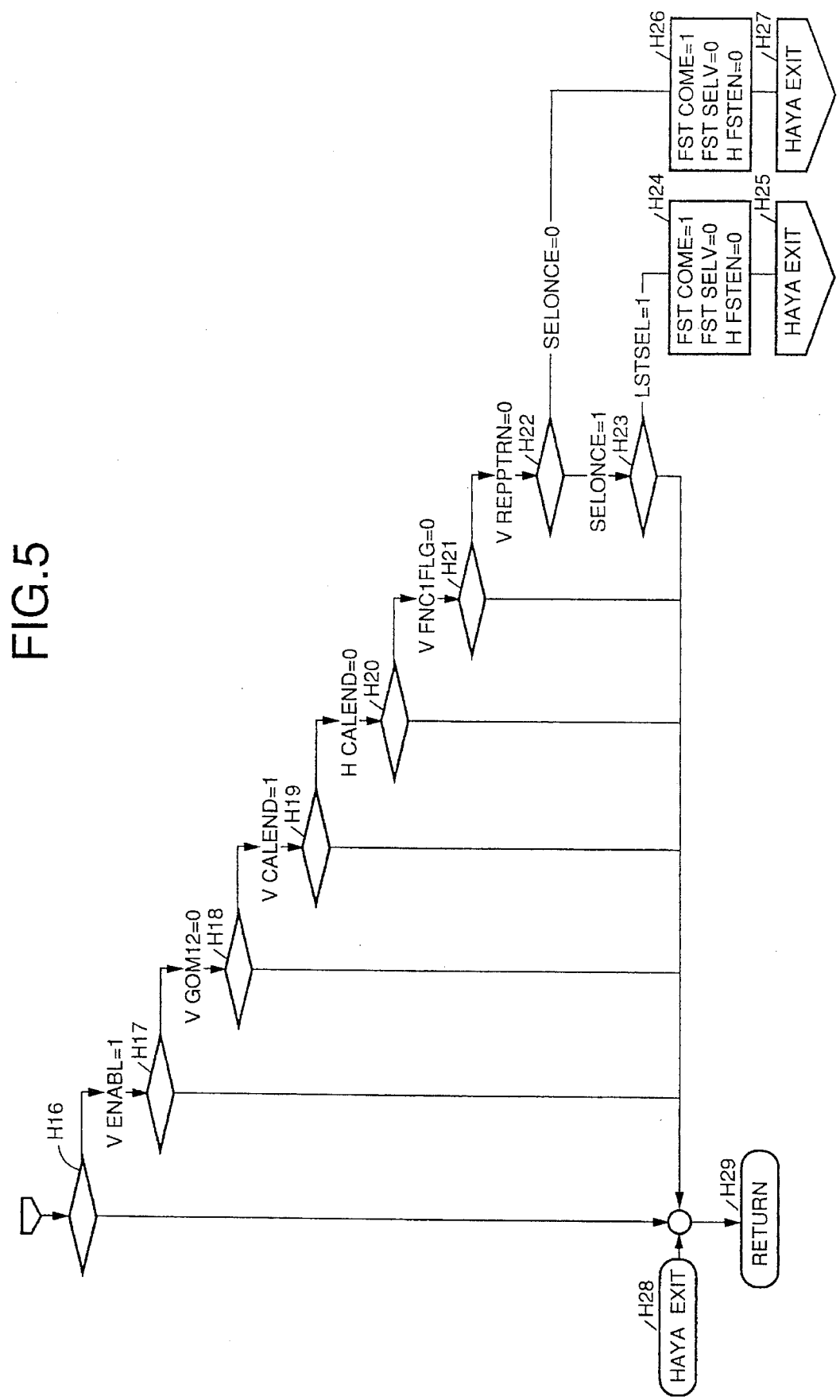
FIG. 5, together with FIG. 4, shows portions of the early priority check subroutine.

At the step H12, jump is made to the step H28 of FIG. 5 whose label is "HAYA_EXIT".

At the step H08, a flag LSTSEL showing that the focus detection point selected in the past is the longitudinal eye is judged. If the flag LSTSEL is 1, that is, the vertical focus detection point was selected the last time, advance is made to the step H13, and if the flag LSTSEL is 0, that is, the horizontal focus detection point was selected the last time, advance is made to a step H09.

At the step H09, as at the step H11, the setting of the flags showing that the horizontal focus detection point has been selected by early priority (FST_COME =1, FST_SELV =0, V_FSTEN =0) is effected, and advance is made to a step H10.

At the step H10, jump is made to the step H28 of FIG. 5 whose label is "HAYA_EXIT".

Summing up what has hitherto been described, if the lateral eye is selected by early priority, advance is made to the step H28, and in the other cases, advance is made to the step H13.

At the step H13, a flag ADSRVMOD showing whether the mode is the servo mode is judged. If the flag ADSRVMOD is 1, that is, the mode is the servo mode, advance is made to the step H16 of FIG. 5, and if the flag ADSRVMOD is 0, that is, the mode is not the servo mode, advance is made to a step H14.

At the step H14, a flag AUXEFF showing whether auxiliary light is being emitted is judged. If the flag AUXEFF is 1, that is, auxiliary light is being emitted, advance is made to a step H15, and if the flag AUXEFF is 0, that is, auxiliary light is not being emitted, advance is made to the step H16 of FIG. 5.

When advance is made to the step H15, jump is made to the step H28 of FIG. 5 whose label is "HAYA_EXIT". This is because the subroutine is terminated without the selection of a vertical focus detection point being effected during the emission of the auxiliary light.

Subsequently, at the step H16, a flag V_ENABL showing whether the vertical focus detection point is in a focus detection state is judged. If the flag V_ENABL is 1, that is, the vertical focus detection point is in a focus detection state, advance is made to a step H17, and if the flag V_ENABL is 0, that is, the vertical focus detection point is not in a focus detection state, advance is made to a step H28. It is to be understood that usually the flag V_ENABL is set to 1.

At the step H17, a flag V_GOM12 showing whether the vertical focus detection point is not capable of focus detection due to dust is judged. If the flag V_GOM12 is 1, that is, the vertical focus detection point is not capable of focus detection due to dust, advance is made to the step H28, and if the flag V_GOM12 is 0, that is, no dust is present and the vertical focus detection point is capable of focus detection, advance is made to a step H18.

At the step H18, a flag V_CALEND showing whether the focus detection calculation of the vertical focus detection point has been terminated is judged. If the flag V_CALEND is 1, that is, the focus detection calculation of the vertical focus detection point has been terminated, advance is made to a step H19, and if the flag V_CALEND is 0, that is, the focus detection calculation of the vertical focus detection point has not been terminated, advance is made to the step H28.

At the step H19, a flag H_CALEND showing whether the focus detection calculation of the horizontal focus detection point has been terminated is judged. If the flag H_CALEND is 1, that is, the focus detection calculation of the horizontal focus detection point has been terminated, advance is made to the step H28, and if the flag H_CALEND is 0, that is, the focus detection calculation of the horizontal focus detection point has not been terminated, advance is made to a step H20. At the step H20, a flag V_FNC1FLG showing whether the reliability of the focus detection data of the vertical focus detection point is good is judged. If the flag V_FNC1FLG is 1, that is, the reliability is null and is not suitable for focus detection, advance is made to the step H28, and if the flag V_FNC1FLG is 0, that is, the reliability is sufficient and is suitable for focus detection, advance is made to a step H21.

At the step H21, a flag V_REPPTRN showing whether the object image at the vertical focus detection point is a repetitive pattern is judged. If the flag V_REPPTRN is 1, there is the possibility of the object image at the vertical focus detection point being a repetitive pattern and therefore advance is made to the step H28, and if the flag V_REPPTRN is 0, the object image at the vertical focus detection point is not a repetitive pattern and therefore advance is made to a step H22.

At the step H22, the flag SELONCE showing whether the selection of the focus detection point has already been effected is judged. If the flag SELONCE is 1, that is, the selection of the focus detection point was effected in the past, advance is made to a step H23 and if the flag SELONCE is 0, that is, the selection of the focus detection point is now effected for the first time, advance is made to a step H26.

At the step H26, flags showing that the vertical focus detection point has been selected by early priority are set. That is, a flag FST_COME showing that the selection of the focus detection point has been effected by early priority is set to 1, a flag FST_SELV showing that the vertical focus detection point has been selected by early priority is set to 1, and a flag H_FSTEN which effects the selection of the focus detection point by early priority and thereafter nullifies the horizontal focus detection point is set to 0. Thereafter, advance is made to a step H27.

At the step H27, jump is made to the step H28 whose label is "HAYA_EXIT".

At the step H23, a flag LSTSEL showing that the focus detection point selected in the past is a longitudinal eye is judged. If the flag LSTSEL is 1, that is, the vertical focus detection point was selected the last time, advance is made to a step H24, and if the flag LSTSEL is 0, that is, the horizontal focus detection point was selected the last time, advance is made to the step H28.

At the step H24, as at the step H26, the setting of the flags showing that the vertical focus detection point has been selected by early priority (FST_COME=1, FST_SELV=1, H_FSTEN=0) is effected, and advance is made to a step H25.

At the step H25, jump is made to the step H28 of FIG. 5 whose label is "HAYA_EXIT".

Summing up the step H16 to this step, if the longitudinal eye has been selected by early priority, the setting of the flags is effected and thereafter advance is made to the step H28, and in the other cases, no process is carried out but advance is made to the step H28.

At a step H29, the "early priority check" subroutine is terminated and return is made, and then advance is made to the step B20 of FIG. 3.

At the step B20, whether the focus detection point has been selected by the early priority check at the step B18 is judged by a flag FST_COME. If FST_COME=1, the loop is passed through and advance is made to a step B24. If FST_COME=0, advance is made to a step B22.

At the step B22, the completion of the loop is checked. Whether the correlation calculation of all sensors in which the accumulation has been done has been completed is judged, and if it has been completed, JUMPFLG is cleared. At a step B23, whether the loop should be repeated or completed is checked by JUMPFLG. That is, if JUMPFLG=1, return is made to the step B09 and the loop is repeated. If JUMPFLG=0, the loop is passed through and advance is made to the step B24.

At the step B24, the process of turning off the auxiliary light is carried out. The process of turning off the auxiliary light is not adversely affected even when the auxiliary light is not emitted and therefore, is always executed without it being judged whether the mode is the auxiliary light mode.

Subsequently, at a step B33, defocus calculation is effected. The value calculated by correlation calculation is the amount of image deviation on the sensor and therefore, predetermined a calculation is applied to this value and the result is converted into a defocus amount.

When the defocus calculation is terminated, advance is made to a step B40, where the "focus detection" subroutine is returned.

In this manner, when the focus detection point has been selected by early priority, the defocus amount for the selected focus detection point is detected, and when the focus detection point is not selected by eary priority, there are obtained defocus amounts DEF1 and DEF2 for two object areas in each of which the defocus amount has been detected. Also, it is to be understood that with respect to each area, the possibility or impossibility of focus detection is judged from the contrast or the like of the image signal by a conventional method.

At the next step 206 (FIG. 12), the "dust detection" subroutine is executed. The "dust detection" subroutine is a subroutine for eliminating any false detection result occurring due to dust present in the focus detecting system (the optical system and sensors). When the execution of the "dust detection" subroutine is terminated, shift is made to a step 207.

At the step 207, whether all sensors, i.e., all object areas, are focus-detectable is judged, and if all sensors are focus-undetectable, shift is made to a step 214, where the "drive lens for search" subroutine is executed. This is the control for executing the focus detecting operation while driving the photo-taking lens when the contrast of the object is low and focus detection becomes impossible, and is disclosed in detail in Japanese Laid-Open Patent Application No. 63-18314 and therefore need not be described herein.

If at the step 207, all object areas are not focus-undetectable, that is, there is a focus-detectable area, shift is made to a step 209, where the "sensor selection" subroutine is executed.

The "sensor selection" subroutine is a subroutine for finally selecting an object area for effecting focus adjustment from among a plurality of focus-detectable object areas(sensors), and the flow chart thereof is shown in FIG. 1.

When the "sensor selection" subroutine is called, the processes of a step S01 and subsequent steps are executed via the select senser step of FIG. 1.

At the step S01, the flag SELONCE showing whether the focus detection point was selected in the past is judged. If the flag SELONCE is 1, that is, the focus detection point was selected in the past, advance is made to a step S02, and if the flag SELONCE is 0, advance is made to a step S05.

At the step S02, a flag LSTSEL showing that the focus detection point selected the last time is the vertical focus detection point is cleared, and advance is made to a step S03.

At the step S03, a flag SELL_V showing that the result of selection is the vertical focus detection point is judged. At this point of time, the flag SELL_V remains set in accordance with the result of the last focus detection and thus, branching-off is effected substantially on the basis of the result of the last selection. If SELL_V is 0 (the horizontal focus detection point was selected the last time), advance is made to a step S05 with the flag LSTSEL remaining cleared at the step S02. If SELL_V is 1 (the vertical focus detection point was selected the last time), advance is made to a step S04, where LSTSEL is set to 1, whereafter advance is made to a step S05.

At the step S05, whether the focus detection point has already been selected by the early priority check is judged by the flag FST_COME. If FST_COME=0, that is, the focus detection point has already been selected by early priority check, advance is made to a step S37. If FST_COME=0, advance is made to a step S09.

At the step S37, a flag FST_SELV is judged. If the vertical focus detection point has been selected by the early priority check, FST_SELV=1 and therefore advance is made to a step S07, where the process when the vertical focus detection point has been selected is carried out. If at the step S37, FST_SELV=0, advance is made to a step S06, where the process when the horizontal focus detection point has been selected is carried out.

When the processes of the steps S07 and S06 are terminated, advance is made to a step S08, where jump is made to SELECT_END (a step S32).

On the other hand, if at the step S05, FST_COME=0, advance is made to a step S09, where whether the mode is the servo mode is judged by a flag ADSERVMOD. If ADSERVMOD=1 (the mode is the servo mode), advance is made to a step S13, and if ADSERVMOD=0, advance is made to a step S10.

At the step S10, whether the current focus detection is the auxiliary light mode is judged by the flag AUXEFF. If AUXEFF=1 (the auxiliary light is emitted in the current focus detection), advance is made to a step S11, where the selection of the horizontal focus detection point is effected. When the process of the step S11 is terminated, advance is made to a step S12, where jump is made to SELECT_END.

If at the step S09, ADSERVMOD=1 and if at the step S10, AUXEFF=0, advance is made to a step S13.

At the step S13, whether the defocus calculation of the vertical focus detection point has been effected is judged by a flag V_DEFCE. If V_DEFCE=0 and the defocus calculation of the vertical focus detection point has not been effected, advance is made to a step S14, where the process of selecting the horizontal focus detection point is carried out, whereafter at a step S15, jump is made to SELECT_END.

At a step S16, whether the defocus calculation of the horizontal focus detection point has been effected is judged by a flag H_DEFCE. If H_DEFCE=0 and the defocus calculation of the vertical focus detection point has not been effected, advance is made to the step S16, where the process of selecting the vertical focus detection point is carried out, whereafter at a step S17, jump is made to SELECT_END.

If H_DEFCE=1 and V_DEFCE=1, advance is made to a step S18, where the "check cancellation of repeated pattern discrimination" subroutine is executed. In the "check cancellation of repeated pattern discrimination" subroutine, the flag H_REPPTRN and the flag V_REPPTRN are cleared from the result of the focus detection of the vertical and horizontal focus detection points. The flag H_REPPTRN and the flag V_REPPTRN are set to "1" when there is the possibility that during the focus detection calculation, the shape of the object image becomes a repetitive pattern, but when the vertical focus detection point and the horizontal focus detection point have detected substantially the same defocus amount, it is judged that focus detection has been done correctly, and the repetitive pattern flags (H_REPPTRN and V_REPPTRN) are cleared. When at the step S18, the process of the "check cancellation of repeated pattern discrimination" subroutine is terminated, advance is made to the step S19 of FIG. 2.

At the step S19, whether the horizontal focus detection point is affected by dust is judged by the flag H_GOM12. If the flag H_GOM12=1, that is, the horizontal focus detection point is affected by dust, advance is made to a step S20, where whether the vertical focus detection point is affected by dust is judged. If V_GOM12=0 and the vertical focus detection point is not affected by dust, advance is made to a step S21, where the process of selecting the vertical focus detection point is carried out, and advance is made to a step S22, where jump is made to SELECT_END.

If at the step S19, H_GOM12=0 or at the step S20, V_GOM1=1, advance is made to a step S23.

At the step S23, whether the horizontal focus detection point is affected by dust is judged by the flag H_GOM12. If the flag H_GOM12=0, that is, the horizontal focus detection point is not affected by dust, advance is made to a step S24, where whether the vertical focus detection point is affected by dust is judged. If V_GOM12=1 and the vertical focus detection point is affected by dust, advance is made to a step S25, where the process of selecting the horizontal focus detection point is carried out and advance is made to a step S26, where jump is made to SELECT_END.

If at the step S23, H_GOM12=1 or at the step S24, V_GOM12=0, advance is made to a step S27.

At the step S27, the comparison between the reliability of the vertical focus detection point and the reliability of the horizontal focus detection point is effected.

Here, the meaning of the reliability and the correspondence between the flags will be described.

Reliability 0: Reliability is very high and is suitable for focus detection.

Reliability 1: Reliability is lower than reliability 0, but is high and is suitable for focus detection.

Reliability 2: Reliability is somewhat low. When the defocus is great, the lens driving is effected, but when the defocus is small, NG is judged.

Reliability 3: Reliability is low and is unsuitable for focus detection.

The relations between the reliability and the flags are as follows:

| | |
|---|---|
| Reliability 0: | FNC1FLG = 0, FNC2FLG = 0, FNC3FLG = 0 |
| Reliability 1: | FNC1FLG = 1, FNC2FLG = 0, PNC3FLG = 0 |
| Reliability 2: | FNC1FLG = 1, FNC2FLG = 1, FNC3FLG = 0 |
| Reliability 3: | FNC1FLG = 1, FNC2FLG = 1, FNC3FLG = 1 |

At the step S27, reliability 1 and reliability 0 are judged without being distinguished from each other, and by the result of this comparison, branching-off is effected at a step S28 and a step S31.

If at the step S28, the reliability of the horizontal focus detection point is reliability 0 or 1 and the reliability of the vertical focus detection point is neither reliability 0 nor reliability 1, advance is made to a step S29. At the step S29, the process of selecting the horizontal focus detection point is carried out and advance is made to a step S32, i.e., SELECT_END.

If the reliability of the horizontal focus detection point is not higher than the reliability of the vertical focus detection point, advance is made to the step S31. If at this step, the reliability of the vertical focus detection point is reliability 0 or 1 and the reliability of the horizontal focus detection point is neither reliability 0 nor reliability 1, advance is made to a step S30. At the step S30, the process of selecting the horizontal focus detection point is carried out and advance is made to the step S32, i.e., SELECT_END.

If branching-off to the step S29 and the step S30 does not take place at the step S28 and the step S31, respectively (there is no great difference in reliability), advance is made to a step S38, where the selection of the focus detection point by majority judgement is effected.

Figure 6:
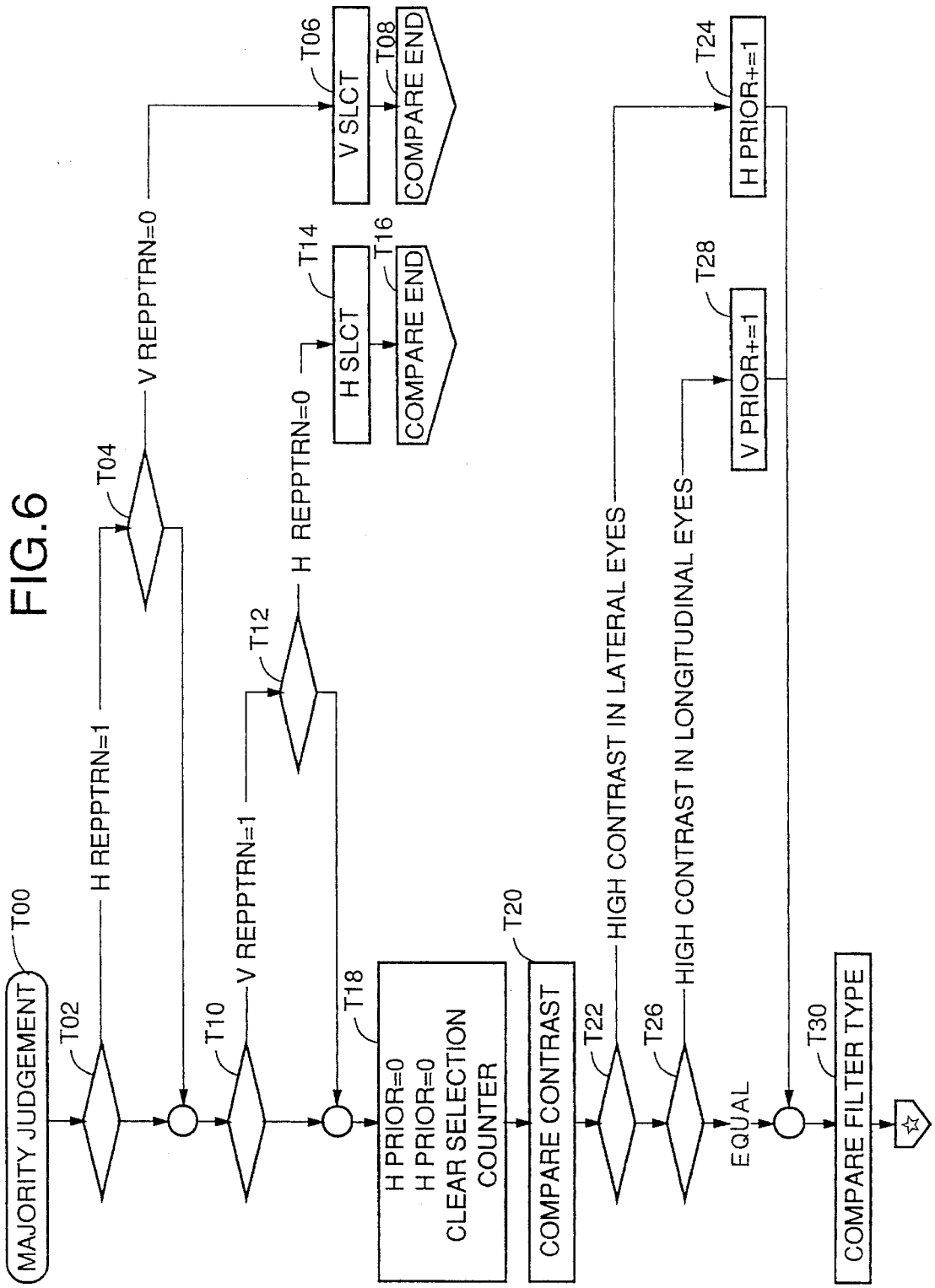
FIG. 6 is an illustration showing portions of the majority judgement subroutine.

FIG. 6 is a flow chart of the focus detection point selection subroutine by majority judgement. When the subroutine majority judgement is called, a step T02 and subsequent steps are executed via a step T00.

At the step T02, whether the horizontal focus detection point is a repetitive pattern is judged by the flag H_REPPTRN and branching-off is effected. If H_REPPTRN=1, advance is made to a step T04, and if H_REPPTRN=0, advance is made to a step T10.

At the step T04, whether the vertical focus detection point is a repetitive pattern is judged by the flag V_REPPTRN and branching-off is effected. If V_REPPTRN=1, advance is made to a step T10, and if V_REPPTRN=0, advance is made to a step T06.

The step T06 is executed if the horizontal focus detection point is a repetitive pattern and the vertical focus detection point is not a repetitive pattern. At the step T06, the process of selecting the vertical focus detection point is carried out and advance is made to a step T08, where jump is made to the step T19 of FIG. 8 (whose label is COMPARE_END).

Unless the horizontal focus detection point alone is a repetitive pattern, the routine of a step T10 and subsequent steps is executed. At the step T10, whether the vertical focus detection point is a repetitive pattern is judged by the flag V_REPPTRN and branching-off is effected. If V_REPPTRN=1, advance is made to a step T12, and if V_REPPTRN=0, advance is made to a step T18.

At the step T12, whether the horizontal focus detection point is a repetitive pattern is judged by the flag H_REPPTRN and branching-off is effected. If H_REPPTRN=1, advance is made to a step T18, and if H_REPPTRN=0, advance is made to a step T14.

The step T14 is executed if the vertical focus detection point is a repetitive pattern and the horizontal focus detection point is not a repetitive pattern. At the step T14, the process of selecting the horizontal focus detection point is carried out and advance is made to a step T16, where jump is made to the step T19 of FIG. 8 (whose label is COMPARE_END).

Unless one of the focus detection points is a repetitive pattern (that is, if neither of the focus detection points is a repetitive pattern or both of the focus detection points are repetitive patterns), advance is made to a step T18, where selection counters H_PRIOR and V_PRIOR are cleared.

Advance is then made to a step T20, where the contrast of the vertical focus detection point and the contrast of the horizontal focus detection point are compared with each other (a "judgment condition"). The focus detection point which is greater in contrast is suited for focus detection and therefore, the selection counter for the focus detection point of greater contrast is counted up. If at a step T22, the contrast of the horizontal focus detection point is greater, branching-off to a step T24 takes place, and the selection counter H_PRIOR for the horizontal focus detection point is counted up, and advance is made to a step T30.

If at the step T22, the contrast of the horizontal focus detection point is smaller, advance is made to a step T26. If here, the contrast of the vertical focus detection point is greater, branching-off to a step T28 takes place, and the selection counter V_PRIOR for the vertical focus detection point is counted up, and advance is made to a step T30. If the contrasts of the two focus detection points are the same, nothing is done but advance is made to the step T30.

At the step T30, the types of the filters are compared (a "judgment condition"). The process by the first or second filter is effected for the focus detection calculation process image signal, but the first filter is better suited for focus detection and therefore, where the first filter is used for only one of the focus detection points, the selection counter for that focus detection point is counted up. As these filters, use is made of digital filters which cut a DC component included in the image signal, and it is to be understood that the first filter passes therethrough a frequency band lower than that passed through the second filter.

Figure 7:
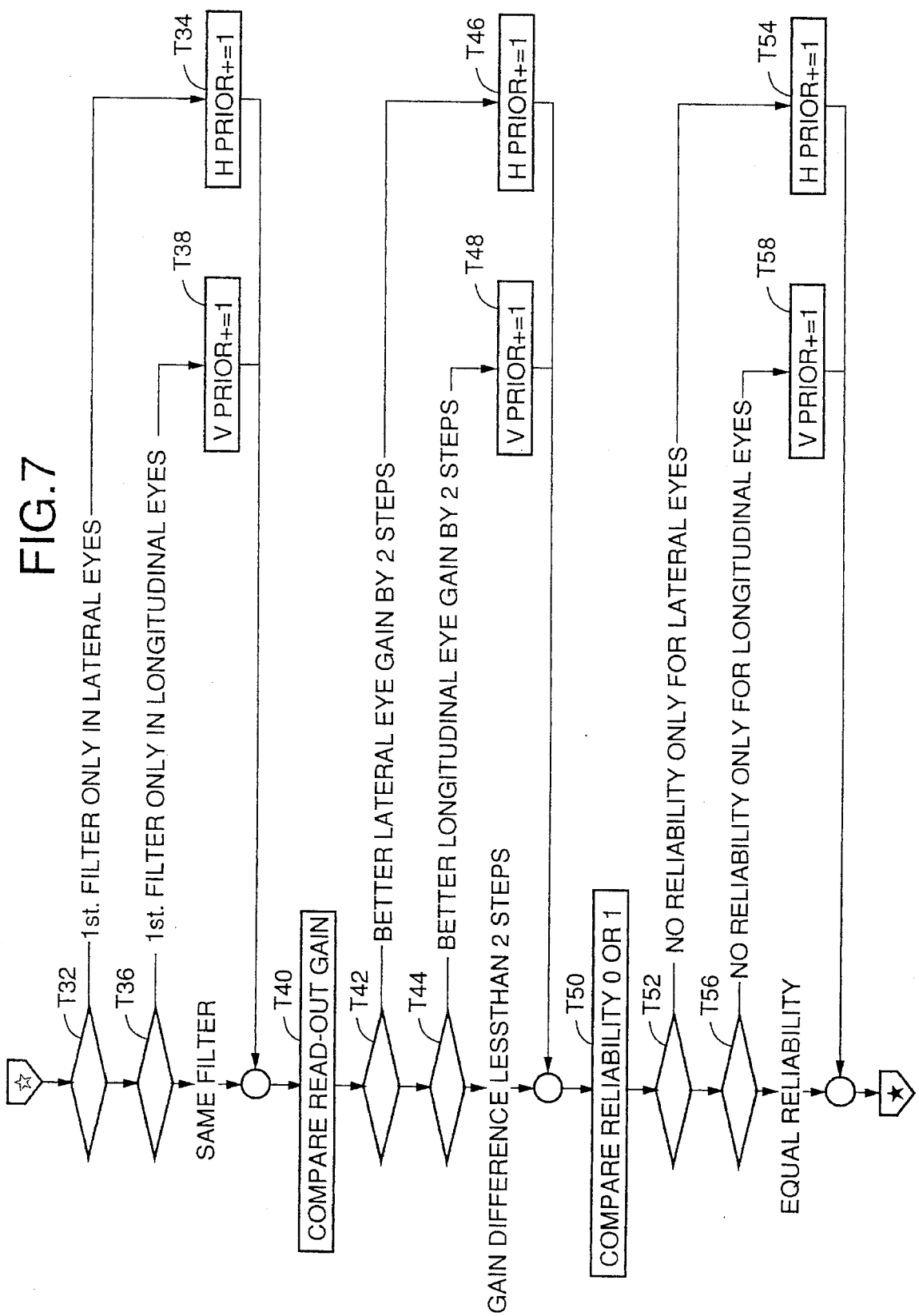
FIG. 7, together with FIG. 6, shows portions of the majority judgement subroutine.

At the step T32 of FIG. 7, when the first filter is used for the horizontal focus detection point and the second filter is used for the vertical focus detection point, branching-off to a step T34 takes place. At the step T34, the selection counter H_PRIOR of the horizontal focus detection point is counted up, whereafter advance is made to a step T40.

At a step T36, when the second filter is used for the horizontal focus detection point and the first filter is used for the vertical focus detection point, branching-off to a step T38 takes place. At the step T34, the selection counter V_PRIOR of the vertical focus detection point is counted up, whereafter advance is made to the step T40.

When the same filter is used for both focus detection points, nothing is done but advance is made to the step T40.

At the step T40, the gains during the reading-out of the sensors (the gains of the amplifiers when the signals from the sensors are read out) are compared with one another (a "judgment condition"). The read-out gains of the sensors are determined by the brightness of the object image and the accumulation time, and there are four kinds of gains, i.e., one time, two times, four times and eight times. Smaller gains are more suitable for focus detection. However, when the difference between the gains is only one step, there is very little predominance and therefore, it is only when there is a difference of two or more steps, that gains becomes the object of comparison. At the step T40, whether there is a difference of two or more steps between the gains is judged, and at steps T42 and T44, the branching-off when there is such difference between the gains is effected.

If at the step T42, the gain of the horizontal focus detection point is better (lower) by two or more steps, advance is made to a step T46, where the selection counter H-PRIOR of the horizontal focus detection point is counted up, and advance is made to a step T50.

If the lateral eye gain is not better by two or more steps, at the step T44, whether the gain of the vertical focus detection point is better by two or more steps is judged, and if said gain is better by two or more steps, branching-off to a step T48 takes place and the selection counter V_PRIOR of the vertical focus detection point is counted up, and advance is made to the step T50.

If there is not a difference of two or more steps between the gain of the horizontal focus detection point and the gain of the vertical focus detection point, neither of the selection counters is counted up and advance is made to the step T50.

At the step T50, reliability is compared (a "judgment condition"). At the step S27 of FIG. 2, the selection of the focus detection points has been effected without reliability 0 and reliability 1 being distinguished from each other, but here, reliability is compared in greater detail.

If at a step T52, only the horizontal focus detection point is of reliability 0, branching-off to a step T54 and the selection counter H_PRIOR of the horizontal focus detection point is counted up, whereafter advance is made to a step T60. Unless only the horizontal focus detection point is of reliability 0, advance is made to a step T56, where whether only the vertical focus detection point is of reliability 0 is judged. If only the vertical focus detection point is of reliability 0, advance is made to a step T58, where the selection counter V_PRIOR of the vertical focus detection point is counted up, and advance is made to a step T60.

Figure 8:
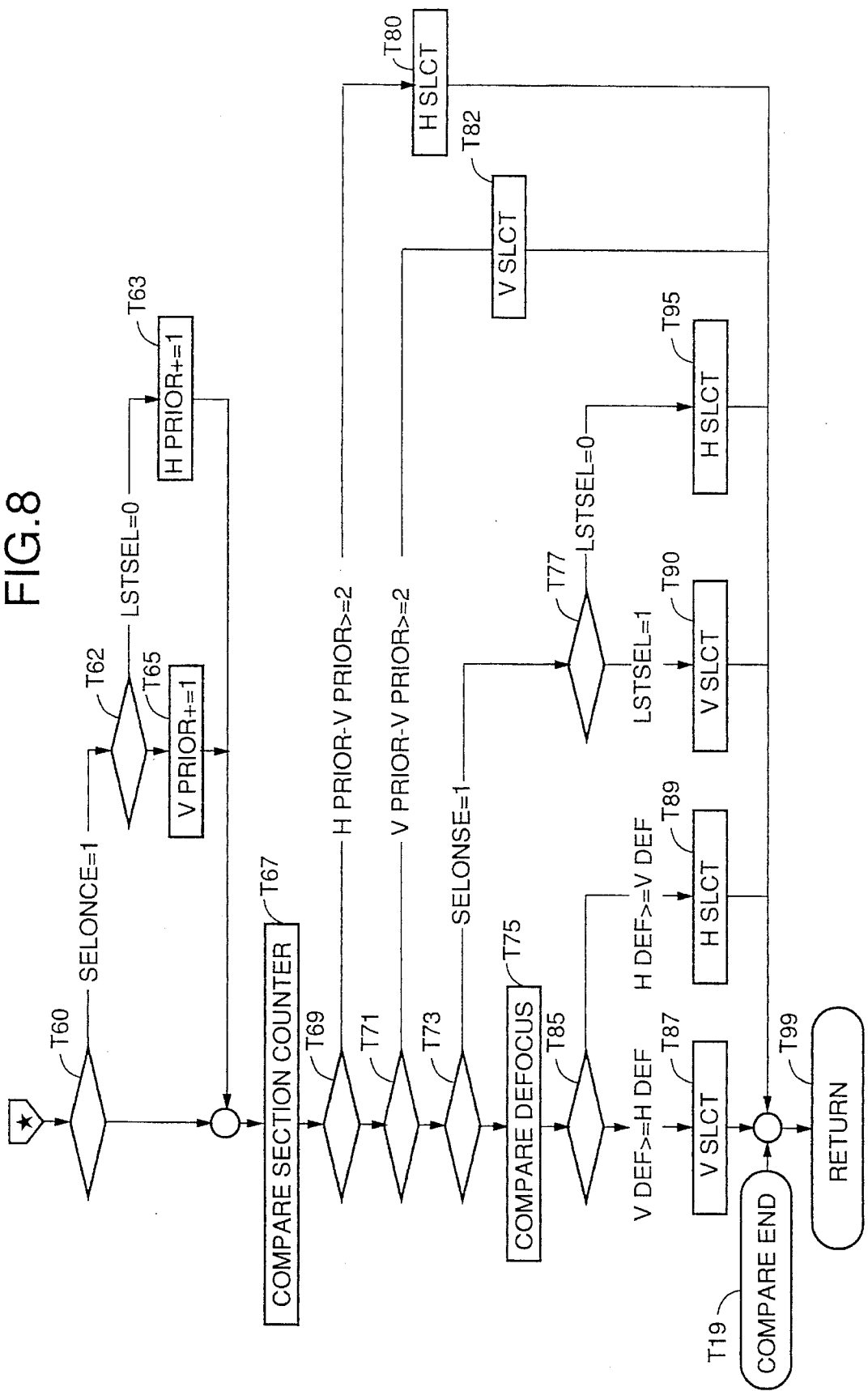
FIG. 8, together with FIGS. 6 and 7, shows portions of the majority judgement subroutine.

If the reliability of the horizontal focus detection point is the same as the reliability of the vertical focus detection point, neither of the selection counters is counted up and advance is made to the step T60 of FIG. 8.

At the step T60, whether focus detection was effected the last time is judged, and if focus detection was effected the last time (SELONCE=1), branching-off to a step T62 takes place and the result thereof is reflected in the judgement of the focus detection point.

If at the step 62, the focus detection point selected the last time is the horizontal focus detection point (LSTSEL=0), advance is made to a step T63, where the selection counter H-PRIOR is counted up. If the focus detection point selected the last time is the vertical focus detection point (LSTSEL=1), advance is made to a step T65, where the selection counter V-PRIOR of the vertical focus detection point is counted up, whereafter advance is made to a step T67.

At the step T67, the selection counters counted up at the steps T20–T65 are compared with each other. Whether there are two or more differences between the selection counter of the horizontal focus detection point and the selection counter of the vertical focus detection point is judged, and if there are such differences, branching-off is effected at a step T69 and a step T71.

If at the step T69, the count value of the selection counter of the horizontal focus detection point is greater by 2 or more than the count value of the selection counter of the vertical focus detection point, at a step T80, the process of selecting the horizontal focus detection point is carried out.

If the count value of the selection counter of the horizontal focus detection point is not greater by 2 or more, advance is made to the step T71, where whether the count value of the selection counter of the vertical focus detection point is greater by 2 or more than the count value of the selection counter of the horizontal focus detection point is judged, and if the former is greater than the latter, at a step T82, the process of selecting the vertical focus detection point is carried out.

When at the steps T80 and T82, the selecting process is terminated, advance is made to a step T19 whose label is COMPARE_END.

If there is not a difference of 2 or more between the selected counter values of the two focus detection points, advance is made to a step T73, where whether the selection of the focus detection point has been effected is judged. If SELONSE=1 and the selection of the focus detection point was effected the last time, branching-off to a step T77 takes place and the same focus detection point as the focus detection point selected the last time is selected this time. That is, if the focus detection point selected the last time is the horizontal focus detection point (LSTSEL=0), the process of selecting the horizontal focus detection point is carried out at a step T95, and if the focus detection point selected the last time is the vertical focus detection point (LSTSEL=1), the process of selecting the vertical focus detection point is carried out at a step T90. When the process of selecting the focus detection points is terminated, advance is made to the step T19.

If at the step T73, the selection of the focus detection points was not effected in the past, advance is made to a step T75, where the defocus is compared and calculated. In the embodiment of the present invention, if the defocus amount is positive, it means rear focus, and if the defocus amount is negative, it means front focus, and thus, the focus detection point which is greater in the detected defocus amount focus-detects the object lying on this side. At a step T85, branching-off is effected on the basis of the result of the comparison and calculation. If the defocus amount of the horizontal focus detection point is greater than the defocus amount of the vertical focus detection point, advance is made to a step T89, where the process of selecting the horizontal focus detection point is carried out. If the defocus amount of the vertical focus detection point is greater than the defocus amount of the horizontal focus detection point, advance is made to a step T87, where the process of selecting the vertical focus detection point is carried out.

When the process of selecting the focus detection points is terminated the "majority judgement" subroutine is terminated at a step T99 via a step T19 (whose label is COMPARE_END), and return is made to the step S32 of FIG. 2.

Subsequently, advance is made to a step S33, where branching-off is effected by the "reliability of the selected focus detection point". If the reliability of the selected focus detection point is better than reliability 2 (FNC3FLG=0), advance is made to a step S35, where the flag SELONCE showing that the selection of the focus detection point has been effected is set to 1. If at the step S33, the reliability of the selected focus detection point is reliability 3, advance is made to a step S34, where the flag SELONCE is cleared. This is for preventing the result of the current selection from influencing the next selection because the focus detection point selected this time is not high in reliability.

At a step S36, the focus detection point selection subroutine is terminated, and shift is made to the step 210 of FIG. 12.

At the step 210, whether the photo-taking lens is in focus is judged on the basis of the finally selected defocus amount. If the photo-taking lens is in focus, shift is made to a step 213, where the "in-focus display" subroutine is executed to thereby display the in-focus in the finder, and at the next step 215, the "AF control" subroutine is returned.

If at the step 210, it is judged that the photo-taking lens is not in focus, shift is made to a step 211, where the lens is driven, and then at a step 215, the "AF control" subroutine is returned.

With regard to the lens driving, use can be made of the method disclosed in applicant's Japanese Laid-Open Patent Application No. 63-18314.

What is claimed is:

1. A focus state detecting apparatus having a plurality of sensor means, for selecting an output from one of said plurality of sensor means, and for detecting a focus state based on the selected output, comprising:

a processing circuit for evaluating a plurality of output signals, which respectively correspond to said plurality of sensor, against a plurality of predetermined judgement conditions, said processing circuit evaluating each one of said judgement conditions against a plurality of said output signals, and determining which one output signal best fulfills each of said plurality judgement conditions; and selection means for determining, after said processing circuit has determined which one output signal best fulfills each of said plurality of judgement conditions, which one of said output signals best fulfills the most judgement conditions, and for selecting the output signal which fulfills the most judgement conditions for focus detection.

2. Apparatus according to claim 1, wherein said judgement conditions include at least a contrast condition and conditions other than the contrast condition.

3. Apparatus according to claim 2, wherein said other conditions include at least a reliability condition.

4. Apparatus according to claim 3 wherein said other judgment conditions include an amplified gain condition for the outputs of said plurality of sensor means.

5. Apparatus according to claim 1, wherein said judgment conditions include at least a reliability condition and conditions other than the reliability condition.

6. Apparatus according to claim 1, further comprising second selection means for selecting the output from one of said plurality of sensor means on the basis of a judgement condition which is different from the plurality of judgement conditions evaluated by said processing circuit, said second selection means selecting the output from one of said plurality of sensor means when the selection on the basis of fulfilling the most judgement conditions cannot be effected.

7. An auto-focus apparatus or a camera including such an auto-focus apparatus, having a plurality of sensor means, for selecting an output from one of said plurality of sensor means, and for performing a focusing function based on the selected output, comprising:

a processing circuit for evaluating a plurality of output signals, which respectively correspond to said plurality of sensor means, against a plurality of predetermined judgement conditions, said processing circuit comparing a plurality of said output signals against each judgement condition and determining which one output signal best fulfills each of said plurality of judgement conditions; and selection means for determining, after said processing circuit has determined which one output signal best fulfills each of said plurality of judgement conditions, which one output signal fulfills the greatest total number of judgement conditions, and for selecting the one output signal as a focus detection signal.

8. Apparatus or camera according to claim 7, wherein said judgment conditions include at least a contrast condition and conditions other than the contrast condition.

9. Apparatus or camera according to claim 7, wherein said judgment conditions include at least a reliability condition and conditions other than the reliability condition.

10. Apparatus or camera according to claim 7, wherein said other conditions include at least a reliability condition.

11. Apparatus or camera according to claim 7, further comprising second selection means for selecting the output from one of said plurality of sensor means on the basis of a judgement condition which is different from the plurality of judgement conditions evaluated by said processing circuit, said second selection means selecting the output from one of said plurality of sensor means when the selection on the basis of the greatest total number of judgement conditions cannot be effected.

12. An auto-focus apparatus, comprising:

a plurality of sensor means each having an output;

a calculation circuit for performing a focus calculation on the output of each of said plurality of sensor means;

first selection means for selecting one calculation result from among the plurality of calculations performed by said calculation circuit when the calculations on the outputs of at least two of said sensor means terminates at substantially the same time, said selection being based on a comparison of each of said outputs against a plurality of predetermined judgement conditions;

second selection means for selecting said one calculation result from among the calculation or calculations which have been completed when the calculation for the outputs of said at least two sensor means do not terminate at substantially the same time; and a focusing circuit for performing a focusing operation on the basis of the calculation result selected by one of the first and second selection means.

13. Auto-focus apparatus comprising:

first and second sensor means;

a processing circuit for processing outputs of said first and second sensor means;

first selection means for, when processing of the outputs of said first and second sensor means are completed substantially simultaneously, selecting one of the processed outputs on the basis of a predetermined judgement condition;

second selection means for, when the processing of the outputs of said first and second sensor means are not completed substantially simultaneously, and when the output of the processing which is first completed fulfills the predetermined judgement condition, selecting the processed output of the sensor means which fulfills the condition and neglecting the output of the other sensor means; and a focus adjusting circuit for performing a focus adjusting operation based on the processed output selected by said first or said second selection means.

14. Auto-focus apparatus having a plurality of sensor means, performing data processing for outputs of each sensor means, selecting one of the processed outputs, and performing a focus adjustment operation based on the selected output, comprising:

a processing circuit for comparing each of a plurality of predetermined judgement conditions against a plurality of processed outputs, and for determining which one processed output best fulfills each one of the plurality of predetermined judgement conditions; and selection means for selecting, after said processing circuit has determined which one output signal best fulfills each of said plurality of judgement conditions, the processed output which fulfills the greatest number of predetermined judgement conditions.

15. A focus state detecting apparatus having a sensor device including a plurality of sensor arrays, for selecting an output from one of said plurality of sensor arrays, and for detecting a focus state based on the selected output, comprising:

a processing circuit for evaluating a plurality of output signals, which respectively correspond to said plurality of sensor parts, against a plurality of predetermined judgement conditions, said processing circuit evaluating each one of said judgement conditions against a plurality of said output signals, said processing circuit relatively evaluating each one of said judgement conditions against the outputs of the sensor arrays, and determining which one sensor array best fulfills each of said plurality of judgement conditions; and selecting means for selecting, after said processing circuit has determined which one sensor array best fulfills each of said plurality of judgement conditions, the sensor array which best fulfills the most judgement conditions.

* * * * *

UNITED STATES PATENT AND TRADEMARK OFFICE
CERTIFICATE OF CORRECTION

PATENT NO. : 5,568,222
DATED : October 22, 1996
INVENTOR(S) : KEISUKE AOYAMA

It is certified that error appears in the above-indentified patent and that said Letters Patent is hereby corrected as shown below:

COLUMN 1

Line 36, "needs" should read --needs to--.

COLUMN 3

Line 27, "a" should read --as--.
Line 28, "s" should be deleted.

COLUMN 4

Line 47, "function" should read --functional--.
Line 60, "specifically" should read --given--.

COLUMN 5

Line 32, "1" should be deleted.

COLUMN 8

Line 47, "H20. At" should read --H20. ¶ At--.

COLUMN 12

Line 2, "V_GOM1=1," should read --V_GOM12=1,--.
Line 35, "PNC3FLG=0 should read --FNC3FLG=0--.

UNITED STATES PATENT AND TRADEMARK OFFICE
CERTIFICATE OF CORRECTION

PATENT NO. : 5,568,222

DATED : October 22, 1996

INVENTOR(S) : KEISUKE AOYAMA

It is certified that error appears in the above-indentified patent and that said Letters Patent is hereby corrected as shown below:

COLUMN 16

Line 52, "sensor," should read --sensor means,--.

COLUMN 17

Line 3, "claim 3" should read --claim 3,--.
Line 42, "claim 7," should read --claim 8,--.

COLUMN 18

Line 53, "parts," should read --arrays,--.

Signed and Sealed this

Eighteenth Day of March, 1997

Attest:

BRUCE LEHMAN

Attesting Officer

Commissioner of Patents and Trademarks